Figure 1:
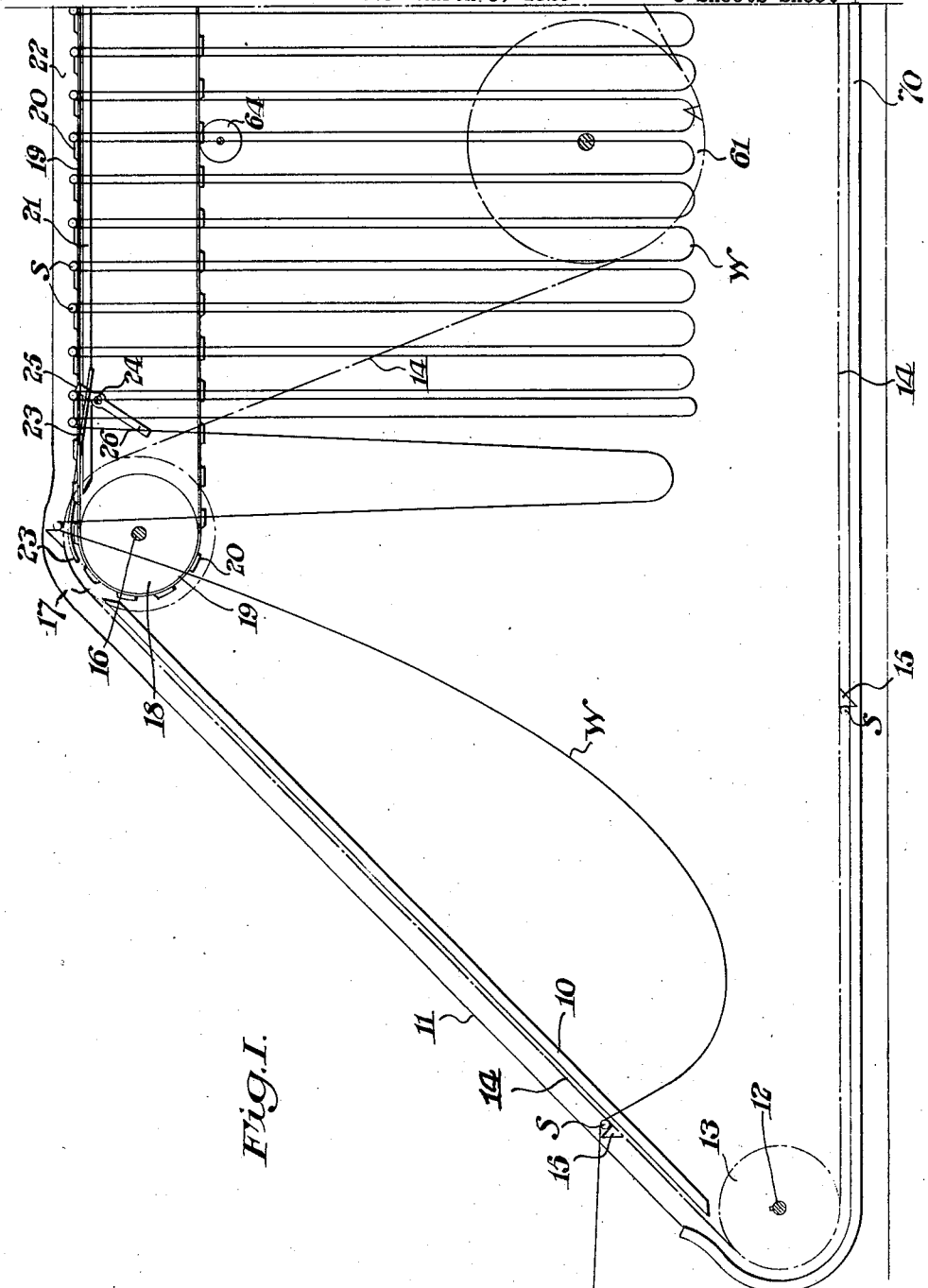

April 27, 1926.

S. M. FORD

FESTOONING MACHINE

Filed March 9, 1920   3 Sheets-Sheet 1

1,582,457

Inventor:
Stuart M. Ford,
Chester H. Braselton
By C. B. DesJardins
Attorneys

April 27, 1926.
S. M. FORD
FESTOONING MACHINE
Filed March 9, 1920 3 Sheets-Sheet 2
1,582,457
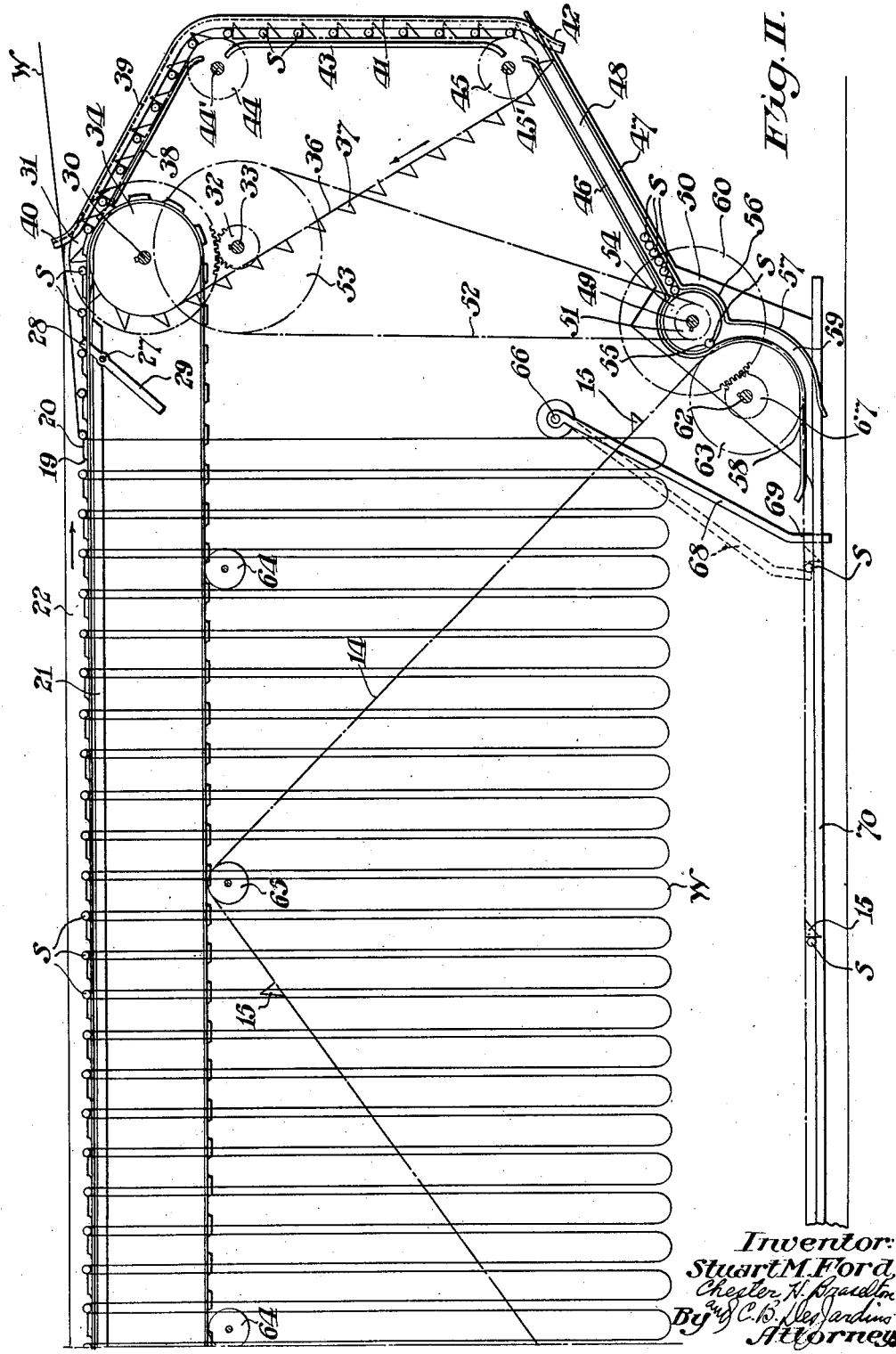
Fig. II.
Inventor:
Stuart M. Ford, April 27, 1926.
S. M. FORD
FESTOONING MACHINE
Filed March 9, 1920   3 Sheets-Sheet 3
1,582,457
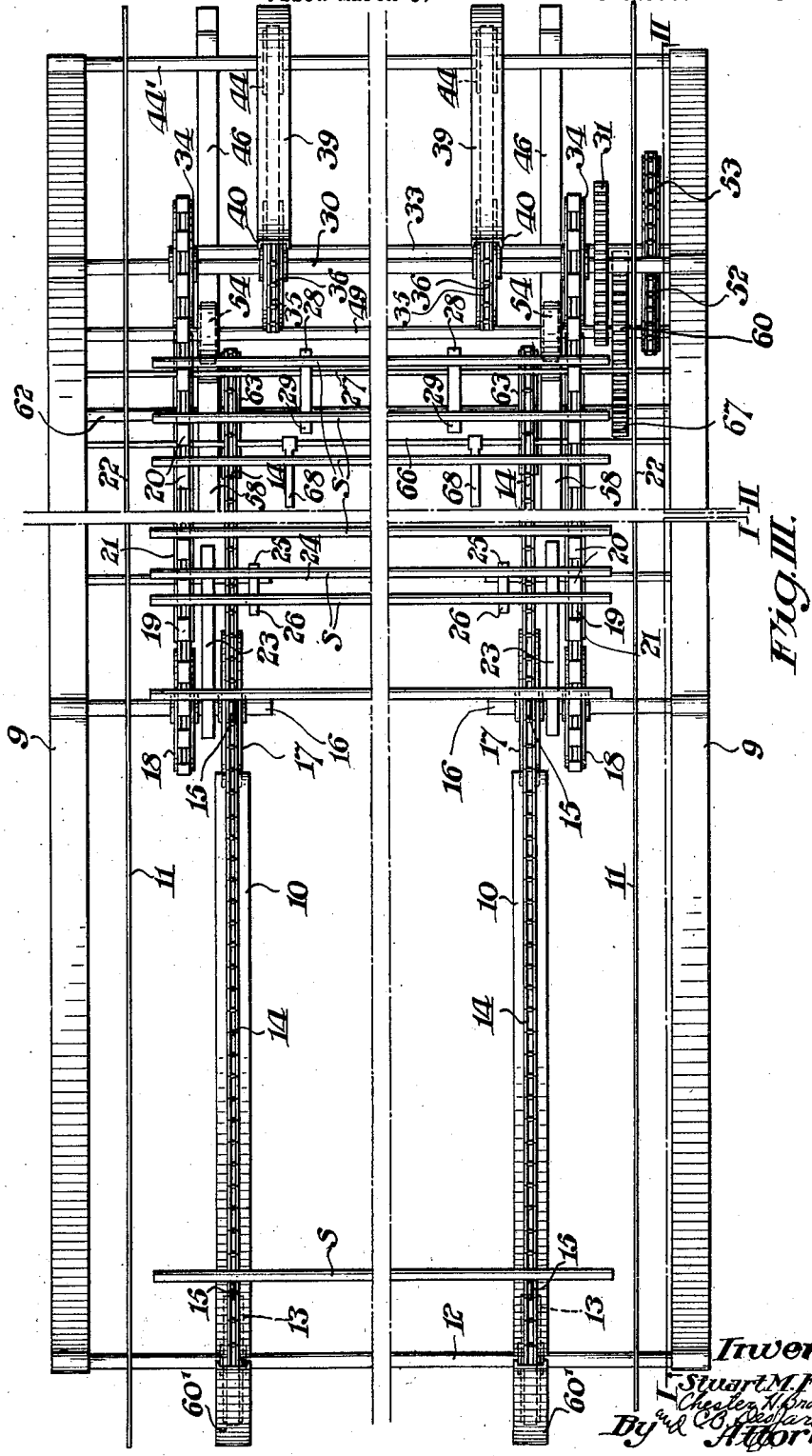

Patented Apr. 27, 1926.

1,582,457

UNITED STATES PATENT OFFICE.

STUART M. FORD, OF BRIDGEPORT, CONNECTICUT.

FESTOONING MACHINE.

Application filed March 9, 1920. Serial No. 364,596.

*To all whom it may concern:*

Be it known that I, STUART M. FORD, a citizen of the United States, residing at Bridgeport, Connecticut, have invented certain new and useful Improvements in Festooning Machines, of which I declare the following to be a full, clear, and exact description.

This invention relates to improvements in festooning machines and has to do more particularly with the mechanism for circulating the festooning sticks.

Festooning or web-hanging machines usually comprise a stick receiving and conveying mechanism moving at a low speed, and a stick elevating mechanism which lifts the sticks and delivers them to the stick receiving and conveying mechanism. The web, which is to be festooned, passes between the endless chains, constituting the stick elevating mechanism, in such way that each stick, as it is lifted and delivered to the stick receiving and conveying mechanism, engages the web and carries it with it to the stick receiving and conveying mechanism, so that the sticks on the latter support the web which hangs from them in long loops or festoons. This festooning is usually for the purpose of facilitating the drying or heating of the web, and therefore the stick receiving and conveying mechanism moves rather slowly and is usually located in a drier or heater. The web is drawn off by suitable mechanism at the drawing off end of the machine, and the sticks are delivered to a suitable receptacle to be transferred to the other end of the machine and delivered to the elevating mechanism.

My invention has to do with mechanism which automatically returns the festooning sticks and delivers them to the stick elevating mechanism at the proper intervals so that an uninterrupted feed of sticks to the stick receiving and conveying mechanism is provided. One of the objects of my invention is to provide simple, automatic means for returning the sticks and insuring their continuous circulation. Another object of my invention is to provide means for transferring the sticks from the stick receiving and conveying mechanism to the elevating mechanism, said means being located at the drawing-off end of the machine where it cannot interfere with the delivery of the web to the machine. Another object of my invention is, to provide a stick transfer mechanism including positively actuated means for feeding a stick to the stick elevating mechanism at predetermined intervals. Another object of my invention is to provide an improved festooning machine having automatic stick-straightening means.

Further objects, and objects relating to economies and details of construction and operation, will definitely appear from the detailed description to follow. A structure, which I consider a preferred embodiment of my invention, is illustrated in the accompanying drawing forming a part of this specification, in which:

Figure I is a view substantially in side elevation with the guard rails at one side removed, of the web-receiving end of the machine, the view being taken on line I—I of Figure III.

Figure II is a similar view on line II—II of Fig. III of the drawing-off end of the machine, and Figure III is a top plan view of the machine, parts being broken away to condense the view.

Referring to the drawings, in which similar reference numerals refer to similar parts throughout the several views, the festooning machine comprises essentially a stick receiving and conveying mechanism, a stick elevating mechanism and a mechanism for removing the sticks from the drawing-off end of the conveying mechanism and transferring them to the elevating mechanism. The operating mechanism is supported from the side frame members, 9, arranged one at each side of the machine, as shown in Fig. III. The stick receiving and conveying mechanism comprises a pair of stub shafts, 16, supported from the side frame members, 9, at the web-receiving end of the machine, and a shaft, 30, journaled in bearings in the side frame members at the drawing-off end of the machine. An idler sprocket, 18, is journaled on each of the stub shafts, 16, the distance between the sprockets, 18, being substantially less than the length of the sticks, S, and greater than the web, W, which is to be festooned in the machine. A pair of sprockets, 34, are keyed on the shaft, 30, in line with sprockets, 18, and a pair of endless chains, 19, run over the sprockets, 18 and 34, and the lower lengths of the chains run over the idler, tension sprockets, 64. The upper lengths of the chains, 19, run in the channel-iron rails, 21, which are supported in any suitable manner and extend between the sprockets 18 and 34. Every other link of the chains, 19, is raised forming flights, 20, which catch the sticks, S, and carry them along with the chains to the drawing-off end of the machine.

The stick elevating mechanism comprises a pair of endless chains which run in proximity to the stick-transfer mechanism at the drawing-off end of the machine and carry the sticks delivered to them to the web-receiving end of the machine, where the sticks are carried up to the stick receiving and conveying mechanism hanging the web in festoons as they are carried up. The shaft, 12, is journaled in bearings in the side frame members, 9, at the web-receiving end of the machine, and the sprockets, 13, are keyed on this shaft. The distance between sprockets, 13, is less than between sprockets, 18, but greater than the width of the web to be festooned in the machine. The idler sprockets, 17, are journaled on the stub shafts, 16, in line with sprockets, 13. A shaft, 62, is journaled in the side frame members, 9, at the drawing-off end of the machine at the same height from the floor as shaft 12. A pair of sprockets, 63, are keyed on shaft, 62, in line with sprockets, 13, and shaft 62 may be driven by the gearing hereinafter described. A pair of endless conveyor chains 14, run over the sprockets, 13, 17 and 63, and over idler tension sprockets, 61 and 65, suitably supported and journaled from the frame. The chains 14 have, at regular intervals, knockers or flights, 15, which engage the sticks, S, and carry them along. A pair of channel rails, 10, are supported in inclined position beneath the lengths of the chains, 14, between sprockets 13 and 17, and a pair of channel rails, 70, extend beneath the lengths of chains, 14, from sprockets, 63, to sprockets, 13, and the rails 70 are curved inwardly upwardly around sprockets, 13, as shown in Fig. 1. A pair of guides, 23, are supported in inclined position between sprockets 17 and 18, and extend from points near the top centers of sprockets, 17, to points below the rails, 21, so that the sticks, S, when leaving chains, 14, move down the inclined guides, 23, to the chains, 19.

Guard rails, 11, are supported alongside of the channel rails 10, at a greater distance apart than the length of sticks, S, so as to prevent the sticks working lengthwise sufficiently to leave the chains. The guard rails, 22, also extend parallel to rails, 21, and in line with the guards, 11, and serve the same purpose.

The stick transfer mechanism comprises a pair of conveyor chains which remove the sticks from the stick conveying mechanism and lower them to a point at which they are discharged into a stick receptacle from which the sticks are automatically fed, one at a time, to the rails 70, where they are received by the stick elevating mechanism, carried to the other end of the machine and lifted to the stick receiving and conveying mechanism. A pair of sprockets, 35, are keyed on shaft, 30, these sprockets being located inside of the sprockets 34. A shaft, 44', is supported from the frame and idler sprockets, 44, are journaled on said shaft, 44', in line with the sprockets, 35. Another shaft, 45, is carried by the frame in vertical alinement with shaft 44' and idler sprockets, 45, are journaled on this shaft in line with sprockets 35 and 44. And endless conveyor chain, 36, runs over each set of sprockets, 35, 44 and 45, and every other link of these chains is formed by a knocker or flight 37. It is to be observed that sprockets 34 and 35 are of the same diameter and have the same number of teeth so that the flights 37 pass between the sticks, S, and transfer these sticks from chains, 19, to chains, 36.

Channel rails, 38 extend beneath the lengths of chains 36, between sprockets, 35 and 44, and similar channel rails 43, extend parallel to the lengths of these chains between sprockets, 44 and 45. Co-operating channel rails extend opposite to the rails, 38 and 43, the portions, 39, being opposite rails, 38, and the portions, 41, being opposite rails, 43. The portions, 39, are curved out at their ends, at 40, and the portions, 41 are curved out at 42, where they join the downwardly inclined channel rails, 47. The latter together with the channel rails, 46, and the side guards, 48, form a stick receptacle to which the sticks, S, are delivered by the chains, 36.

The guard plates, 50, are suitably supported in line with the guards, 11 and 22, and the side guards, 48, are extensions from these guard plates. The channel rails, 46 and 47, are curved away from each other to form the cylindrical casings, 56, and the portions, 57, and 58, of these channel rails extend downwardly from the casings, 56, forming the curved passages, 59, extending to the rails, 70. The shaft, 49, is journaled in bearings in the frame of the machine and extends through the axis of casings, 56. This shaft may be driven from any suitable source of power (not shown). A pair of cams, 54, are keyed on this shaft within the casings 56, and each cam has a peripheral notch, 55, large enough to receive one of the sticks, S. At each revolution of shaft, 49, one of the sticks in the receptacle drops into the alined notches, 55, in the two cams, 54, and is carried around and delivered into the passage, 59.

A gear, 60, keyed on shaft, 49, meshes with a smaller gear, 67, keyed on shaft, 62, and thus drives the shaft, 62, at a considerably higher speed. A small sprocket, 51, keyed on shaft, 49, drives the chain, 52, which passes over the large sprocket, 53, keyed on shaft, 33, and, hence, shaft, 49, drives shaft, 33, at a considerably lower speed. The small gear, 32, keyed on shaft, 33, meshes with the large gear, 31, keyed on shaft, 30, and the latter shaft is driven by shaft, 33, at a further reduction in speed. It appears that the chains, 14, are driven faster than cam shaft, 49, and that the chains, 19, driven from shaft, 30, move much slower than chains, 14. The chains, 36, are driven also from shaft, 30, and move at the same speed as chains, 19.

As the sticks, S, move down the inclined guides, 23, to the chains, 19, they engage the upper ends, 25, of bars pivoted on suitable stub shafts, 24. The lower ends, 26, of these bars are heaviest, so that the bars tend to stay in a vertical position. These pivoted bars move the sticks back against the flights, 20, and properly space and straighten the sticks on the chains, 19. At the drawing-off end of the machine, are a similar pair of bars pivoted on the rod 27 so that their upper ends engage the sticks to straighten them just as the web is drawn from the stick by the drawing-off roll (not shown). The heavier ends 29 of these pivoted bars tend to hold them in vertical position. The shaft 66 is supported from the frame and a pair of bar stops, 68, are pivoted on this shaft with their ends, 69, extending between the rails, 70. As a stick is delivered to the rails, 70, by cams, 54, it moves on the rails, 70, until it engages the lower ends, 69, of stops, 68. As soon as the stick is engaged by flights, 15, the stops are pushed out of the way and the stick carried along the rails by chains, 14. These stops, 68, straighten the sticks as they are delivered to the elevating chains, 14.

From the description of the parts given above, the operation of the machine should be very readily understood. The web of material, which is to be festooned in the machine and carried thus through the drier or heater, passes between the channel rails, 10, and the chains, 14. The chains, being driven by sprockets, 63, each pair of flights, 15, carries upwardly, on the inclined rails, a stick, S. As this stick moves upwardly it engages the web, W, and since the flights, 15, are spaced considerable distances apart, the web hangs on the stick in a loop or festoon as shown. As the chains, 14, pass over the sprockets, 17, the sticks, S, move down guides, 23, and are transferred to the slow-moving chains, 19, of the stick receiving and conveying mechanism carrying with them the festooned web. These chains, 19, run relatively very slow and every other link is made up by one of the flights, 20, the relative speeds of chains, 14 and 19, and the spacing of the flights being such that a stick is delivered from the chains, 14, to the chains, 19, in front of each pair of flights, 20. The stick adjusters, 25, automatically straighten the sticks and hold them against flights, 20, so that the sticks are carried by chains, 19, through the heater or drier in uniformly spaced relationship with the web festooned in uniform loops. The web is drawn off, at the drawing-off end of the machine, by any suitable means (not shown) and leaves the sticks just before they reach the sprockets, 34. The stick adjusters, 28, straighten the sticks, in case they should be twisted by the drawing off of the web, and the flights 37, catch the sticks and transfer them to the chains 36, which lower them and discharge them into the stick receptacle between the rails 46 and 47. At each revolution of the shafts, 49, the cams 54, receive a stick in the notches 55, and discharge it through the passage 59, to the rails 70, where the flights 15, engage it, carry it against the swinging stops 68, which straighten it, and carry it along the rails 70, and up the inclined rails 10, as has been described.

The circulation of the sticks from the drawing-off end to the web-receiving end of the machine is entirely automatic and the entire mechanism for transferring the sticks from the stick receiving and conveying mechanism to the elevating mechanism is located at the drawing-off end of the machine. This is important because it leaves the other end of the machine clear, so that a coating machine, for instance, can be placed there to coat the web just before it passes to the festooning machine. The feeding of the sticks to the elevating mechanism is adequately controlled so that a stick is fed to it at predetermined intervals and there is no chance of the flights, 15, engaging more than one stick at a time.

I am aware that the embodiment of my invention illustrated and described in this specification is susceptible of considerable variation without departing from the spirit of my invention, and, therefore, I desire to claim my invention broadly, as well as specifically, as indicated by the appended claims.

Having thus described my invention what I claim as new and desire to secure by Letters Patent, is:—

1. A machine of the class described comprising the combination of stick conveying mechanism, stick elevating mechanism delivering sticks to one end of said conveying mechanism, means for transferring sticks from the other end of said conveying mechanism to said elevating mechanism and means for adjusting said sticks to a proper position on said transferring means.

2. A machine of the class described comprising the combination of stick-conveying mechanism, stick-elevating chain conveyor delivering sticks to said conveying mechanism at the web-receiving end of the machine and extending to the other end of said machine, a receptacle for the sticks, mechanism removing sticks from the conveying mechanism and delivering said sticks to said receptacle, and means for feeding a stick at predetermined intervals from said receptacle to said elevating chain conveyor at the drawing-off end of the machine.

3. A machine of the class described comprising stick conveying mechanism, a continuous endless chain stick-elevating mechanism operating to carry sticks from the drawing-off end to the web-receiving end of the machine and to lift and deliver said sticks to the web-receiving end of said conveying mechanism and means for transferring sticks from said conveying mechanism to said elevating mechanism.

4. A machine of the class described comprising the combination of a stick-carrier, a pair of driven conveyor chains operating to carry sticks from one end of said carrier to the other and to deliver said sticks to the carrier, and means for transferring sticks from said carrier to said chains.

5. A machine of the class described comprising the combination of a stick carrier, a pair of driven conveyor chains operating to carry sticks from one end of said carrier to the other and to deliver sticks to said carrier, mechanism for removing sticks from said carrier and delivering them to a receptacle, and means for feeding a stick at predetermined intervals from said receptacle to said chains.

6. A machine of the class described comprising the combination of a stick-carrier, a rail below said carrier and extending substantially the length thereof, a conveyor running the length of said rail and inclined upwardly from one end of said rail to one end of said carrier, and mechanism for transferring sticks from the other end of said carrier to the corresponding end of said rail.

7. A machine of the class described comprising the combination of a stick-carrier, a rail below said carrier on which the sticks may ride from one end of the machine to the other, a conveyor chain operating to propel said sticks along said rail and lift and deliver them to one end of said carrier, and means for transferring sticks from the other end of said carrier to said rail.

8. A machine of the class described comprising a stick receiving and conveying mechanism, a pair of rails extending the length of said mechanism, a pair of endless conveyor chains, each having a length paralleling one of said rails and a length inclined upwards from the rail to one end of said conveying mechanism, and means for transferring sticks from the other end of said conveying mechanism to said rails.

9. A machine of the class described comprising a stick receiving and conveying mechanism, a pair of rails extending the length of said mechanism, a pair of endless conveyor chains, each having a length paralleling one of said rails and a length inclined upwards from the rail to one end of said conveying mechanism, mechanism removing sticks from said conveying mechanism and transferring them to a stick receptacle, and means for feeding a stick from said receptacle to said rails at predetermined intervals.

10. In a machine of the class described, the combination of stick receiving and conveying mechanism including a pair of endless conveyor chains, stick elevating mechanism, stick guides intermediate the elevating mechanism and conveyor disposed to guide the sticks from the elevating mechanism to said chains and means for adjusting said sticks on the conveyor.

11. In a machine of the class described, the combination of stick receiving and conveying mechanism including a pair of suitably mounted sprockets at each end of said mechanism and a pair of endless conveyor chains carried by said sprockets, stick elevating mechanism including a pair of sprockets at the web-receiving end of said conveying mechanism, and a pair of endless conveyor chains running on said last-mentioned sprockets, and a pair of inclined guides disposed to guide the sticks from said last mentioned sprockets to the chains of the conveying mechanism.

12. In a machine of the class described, the combination of stick receiving and conveying mechanism including a pair of sprockets at each end of said mechanism, a pair of endless conveyor chains running on said sprockets, and a rail disposed below the upper length of each chain, stick elevating mechanism including a pair of sprockets at the web-receiving end of the conveying mechanism and a pair of endless conveyor chains running on said sprockets, and a pair of guides inclined downwardly from the level of the uppermost points of said last-mentioned sprockets to the level of said rails.

13. In a machine of the class described, the combination of a pair of rails, a pair of driven, endless conveyor chains having their upper lengths extending along and above said rails, and a plurality of stick-adjusters comprising a plurality of pivoted bars each disposed with its lighter end projecting above the rail in position to be yieldably engaged by the sticks carried on said chains.

14. A machine of the class described comprising the combination of stick receiving and conveying mechanism, stick elevating mechanism, mechanism for removing the sticks from the drawing-off end of the conveying mechanism, a receptacle in which said removing mechanism deposits the sticks, and a rotating means adapted to receive a stick and carry it in a portion of its path of rotation from said receptacle to said elevating mechanism at predetermined intervals.

15. A machine of the class described, comprising the combination of stick receiving and conveying mechanism, stick elevating mechanism, mechanism for removing the sticks from the drawing-off end of the conveying mechanism, a receptacle in which said removing mechanism deposits the sticks, and a rotating feed cam on said shaft having a peripheral notch adapted, at each revolution of the shaft, to receive a stick from said receptacle and feed it to said elevating mechanism.

16. In a machine of the class described, the combination of a pair of driven, endless conveyor chains, and a plurality of stick-adjusters comprising a plurality of pivoted bars, each disposed with its lighter end projecting above the upper length of one of said chains in a position to be yieldably engaged by the sticks carried on said chains.

17. A machine of the class described, comprising the combination of stick receiving and conveying mechanism, stick elevating mechanism for delivering sticks to said conveying mechanism, mechanism for removing the sticks from the drawing-off end of the conveying mechanism, and a rotating feed cam on said shaft having a peripheral notch adapted at each revolution of the shaft, to receive a stick from said removing mechanism and deliver it to said elevating mechanism.

18. A machine of the class described, which comprises a stick conveying mechanism arranged to carry sticks in a uniform spaced relation, a stick returning and elevating mechanism extending beneath said stick conveying mechanism and comprising a single endless conveying chain, means for gradually lowering sticks from the discharge end of said stick conveying mechanism, a storage magazine to receive said lowered sticks and means for feeding sticks from said storage magazine to said stick returning and elevating mechanism singly in a sidewise movement.

In testimony whereof, I affix my signature.

STUART M. FORD.